US012584808B2

(12) United States Patent
Wheen

(10) Patent No.: US 12,584,808 B2
(45) Date of Patent: Mar. 24, 2026

(54) TORQUE SENSOR ELEMENT AND TORQUE SENSOR

(71) Applicant: Dyson Technology Limited, Wiltshire (GB)

(72) Inventor: Oliver Joe Wheen, Brighton (GB)

(73) Assignee: Dyson Technology Limited, Malmesbury (GB)

( * ) Notice: Subject to any disclaimer, the term of this patent is extended or adjusted under 35 U.S.C. 154(b) by 357 days.

(21) Appl. No.: 18/020,674

(22) PCT Filed: Aug. 12, 2021

(86) PCT No.: PCT/GB2021/052090
§ 371 (c)(1),
(2) Date: Feb. 10, 2023

(87) PCT Pub. No.: WO2022/034326
PCT Pub. Date: Feb. 17, 2022

(65) Prior Publication Data
US 2023/0266186 A1 Aug. 24, 2023

(30) Foreign Application Priority Data

Aug. 14, 2020 (GB) ..................................... 2012720

(51) Int. Cl.
*G01L 3/14* (2006.01)
*B25J 19/02* (2006.01)
*G01L 5/22* (2006.01)

(52) U.S. Cl.
CPC ........... *G01L 3/1435* (2013.01); *B25J 19/027* (2013.01); *G01L 5/226* (2013.01)

(58) Field of Classification Search
CPC ......... G01L 3/1435; G01L 5/226; G01L 3/04; G01L 3/14; B25J 19/027; B25J 13/085
See application file for complete search history.

(56) References Cited

U.S. PATENT DOCUMENTS 3,550,395 A * 12/1970 Herzog ..................... G01L 3/10
403/291
6,694,828 B1 * 2/2004 Nicot ....................... B62D 1/16
73/862.08

(Continued)

FOREIGN PATENT DOCUMENTS

CN 104215372 A 12/2014
CN 106918411 A * 7/2017

(Continued)

OTHER PUBLICATIONS

International Search Report and Written Opinion received for PCT Patent Application No. PCT/GB2021/052090, mailed on Oct. 28, 2021, 10 pages.

(Continued)

*Primary Examiner* — Octavia Hollington
(74) *Attorney, Agent, or Firm* — Tucker Ellis LLP

(57) ABSTRACT

A torque sensor element for measuring a torque applied to a joint is described. The torque sensor element includes: an outer frame and an inner frame respectively to connect to first and second sides of a joint; and a compliant arrangement connecting the outer frame to the inner frame. The compliant arrangement includes: first and second members, each extending between and connecting the outer and inner frames, and each being resilient and deformable to permit some relative rotation between the outer and inner frames in response to an applied torque. A connecting structure extends between the first and second members and includes a first portion intermediate the first and second members which is configured responsive to a deformation of the first and/or second member to move by an amount determined by a degree of relative rotation between the outer and inner frames caused by a torque applied to the joint.

19 Claims, 9 Drawing Sheets

(56)          References Cited

U.S. PATENT DOCUMENTS

| | | | | |
|---|---|---|---|---|
| 6,871,552 B2 * | 3/2005 | Liu | ..................... | G01L 1/22 |
| | | | | 73/862.041 |
| 7,093,477 B2 * | 8/2006 | Herbold | ................. | B25B 23/14 |
| | | | | 73/1.11 |
| 9,038,484 B2 * | 5/2015 | Seibold | ................. | G01L 5/1627 |
| | | | | 73/862.045 |
| 10,239,213 B1 | 3/2019 | Reich | | |
| 11,187,600 B2 * | 11/2021 | Akiba | ................... | G01L 5/0061 |
| 11,841,286 B2 * | 12/2023 | Okuma | ................. | G01L 3/1421 |
| 2016/0102724 A1 | 4/2016 | Potter et al. | | |
| 2017/0266814 A1 * | 9/2017 | Uemura | ................. | B25J 13/085 |
| 2019/0299421 A1 * | 10/2019 | Kim | .................... | B25J 19/0091 |

FOREIGN PATENT DOCUMENTS

| | | | | | | |
|---|---|---|---|---|---|---|
| CN | 108931328 | A | | 12/2018 | | |
| CN | 110088584 | A | | 8/2019 | | |
| CN | 114370968 | A | * | 4/2022 | ........... | G01L 1/2206 |
| CN | 118464258 | A | * | 8/2024 | ............... | G01L 3/10 |
| DE | 202016008596 | U1 | * | 7/2018 | ............ | G01L 5/226 |
| DE | 202016008600 | U1 | | 8/2018 | | |
| EP | 1353159 | A2 | * | 10/2003 | ........... | G01L 3/1457 |
| JP | 2019056680 | A | | 4/2019 | | |
| WO | 2014/110682 | A1 | | 7/2014 | | |
| WO | WO-2018092112 | A1 | * | 5/2018 | ............... | G01L 1/14 |
| WO | 2018/124081 | A1 | | 7/2018 | | |

OTHER PUBLICATIONS

Search Report and Examination Report received for GB Application No. 2012720.5, mailed on Feb. 16, 2021, 2 pages.

* cited by examiner

TORQUE SENSOR ELEMENT AND TORQUE SENSOR

CROSS-REFERENCE TO PRIOR APPLICATION

This application is a § 371 National Stage Application of PCT International Application No. PCT/GB2021/052090 filed Aug. 12, 2021, which claims the priority of United Kingdom Application No. 2012720.5, filed Aug. 14, 2020, each of which are herein incorporated by reference in their entirety.

TECHNICAL FIELD

The present invention relates to a torque sensor element for measuring a torque in a joint. The present invention also relates to a torque sensor comprising the torque sensor element, in particular, but not exclusively, for measuring a torque in a joint of a robotic device.

BACKGROUND

Certain classes of robot have one or more articulated arms having an end effector, which may also be known as a manipulator, for performing certain tasks. The robot typically comprises a body and a number of mechanical links linking the end effector to the body. The mechanical links are typically connected to one another by one or more rotatable joints, control of which allows the movement of the end effector to be controlled to allow a given task to be performed. For example, a joint of the one or more joints may be operated by a motor which applies a torque to control the position of the joint. Various control schemes may be used to control the robot. For example, some control schemes may apply impedance control, which allows the end effector to be controlled based on a relationship between external forces exerted on the end effector and a position of the end effector.

Data relating to the joints is typically gathered to allow control of the robotic device and, for example, to determine how the robot is situated in relation to its environment or how the robotic device is interacting with the environment. For example, it may be important to know the orientation of the joints in order to accurately control the location of the end effector or other parts of the robotic device. Certain types of detector or sensor may be used to obtain such data relating to the joints. For example, detectors in a joint of the robotic device may gather data relating to a position, e.g. an angular position, of the joint and feed this data back to the controller such that the controller is able to control the joint accordingly. Torque sensors may also be used to detect torques being applied to a joint. For example, a joint may be controlled by applying a torque to the joint by a joint motor. A torque sensor may be used to measure the torque applied by the motor.

Detecting the torque applied to a joint may also allow the detection of torques or forces applied to the robot by its environment. For example, a torque sensor may detect external torques which indicate a collision between the robot, e.g. the end effector, with an object in the environment. Detecting such torques quickly and accurately may be important for ensuring the robot operates safely. This is particularly the case when the robot is operating in a human environment, since the robot may have large moving masses which may present a danger to humans if not controlled safely. A torque sensor may also, for example, allow the weight of a load being carried by the robot to be determined by determining the external torque acting on the robot when the load is carried. Further, since joints of the robotic device may be controlled by applying a torque to the joint, e.g. via an electric motor, measurements of the torque being applied to control the joint can be made and taken into account in calculations involved in controlling the joint.

FIG. 1 shows a plan view of an example prior art torque sensor element 100 for use in a joint of a robotic device (not shown). The prior art torque sensor 100 is generally planar, comprising a circular frame including an outer frame 110, an inner frame 120, and an arrangement of beams 130 which connect the outer frame 110 to the inner frame 120. The torque sensor 100 comprises a compliant arrangement made up a plurality of flexures 140 which extend between and connect the inner frame 120 to the outer frame 110. The inner frame 120 of the torque sensor 100 defines a central aperture 150 through which electrical wiring and the like of a joint may pass when the torque sensor 100 is installed in a joint of a robotic device. Being generally circular and generally planar, the torque sensor element 100 may be located in a joint between a first member and a second member of the robotic device, for example in a rotational 'elbow' joint. The outer frame 110 comprises a first series of holes 112 to allow the outer frame 110 to be secured to a first side of the joint of the robotic device, while the inner frame 120 comprises a second series of holes 122 which allow the inner frame 120 to be secured to a second side of the joint. When installed in a joint, therefore, the first side and second side of the joint are connected to one another via the torque sensor 100, such that any torque applied about the joint is transmitted through the torque sensor 100.

The beams 130 are configured to connect the outer frame 110 and the inner frame 120 with a relatively high stiffness to allow the torque sensor 100 to transmit the torque without a large degree of movement between the outer frame 110 and the inner frame 120. However, the beams 130 allow a small amount of relative rotational movement between the outer frame 110 and the inner frame 120 under an applied torque. When such a relative rotational movement occurs, the flexures 140 deform. The degree of deformation of the flexures 140 can be measured to measure a torque applied to the torque sensor 100.

Each of the flexures 140 is arranged with another of the flexures 140 as an opposing pair of flexures. At a free end of each of the flexures 140 is an electrode plate, which, together with the electrode plate of the other flexure of the pair, forms a respective capacitive sensor C1, C2, C3, C4 for each pair of flexures 140. The electrode plates of the flexures 140 within the pair are arranged substantially parallel with one another when no torque is being applied to the torque sensor 100. The pair of electrode plates in each capacitive sensor C1, C2, C3, C4 are configured to move relative to one another, increasing or decreasing a gap therebetween, when the flexures 140 are deformed. A capacitance of the capacitive sensors C1 to C4 varies according to the respective distance between each pair of electrodes (i.e. the size of the gap) and also varies with a degree of overlap between the electrodes. Accordingly, when the flexures 140 flex due to the relative movement of the outer frame 110 and inner frame 120, a change in capacitance is detected by the capacitive sensors 142. This change in capacitance may be detected and used to determine the torque applied to the torque sensor 100.

FIG. 1 shows, by way of arrows, how the direction of rotation between the inner frame 120 and the outer frame 110 results in movement of the respective electrode plates of the capacitive sensors C1, C2, C3, C4. That is, an applied torque which causes the inner frame 120 to rotate in a clockwise direction while the outer frame 110 remains in a fixed position results in the electrodes of first and third capacitive sensors C1, C3 being forced apart. Meanwhile, under the same torque, the electrodes of second and fourth capacitive sensors C2, C4 are forced closer together. By measuring the resulting changes in capacitance, the applied torque can be determined.

SUMMARY

According to a first aspect of the present invention there is provided a torque sensor element for measuring a torque applied to a joint, the torque sensor element comprising: an outer frame to connect to a first side of a joint; an inner frame to connect to a second side of the joint; and a compliant arrangement connecting the outer frame to the inner frame wherein the compliant arrangement comprises: a first member and a second member, each extending between and connecting the outer frame to the inner frame, and each member being resilient and deformable to permit at least some relative rotation between the outer frame and the inner frame in response to a torque applied to the joint; and a connecting structure extending between the first member and the second member, the connecting structure comprising a first portion intermediate the first member and the second member which is configured in response to a deformation of the first and/or second member to move by an amount determined by a degree of relative rotation between the outer frame and the inner frame caused by a torque applied to the joint.

Examples according to the invention allow for a torque applied to the torque sensor element to result in a movement of the first portion on the connecting structure. This allows a reliable way of translating the relative rotation of the outer and inner frames into a measurable movement of a portion of the torque sensor element. In examples according to the invention, there is no need to measure an overlap between portions of a compliant structure, as is the case in the prior art arrangement shown in FIG. 1. Examples according to the invention may therefore provide an alternative to such prior arrangements.

The movement of the first portion of the connecting structure in response to the deformation of the first and/or second member may comprise at least a rotational component.

This allows for measurement of the relative rotation between the inner and outer frames by measuring a rotation of the first portion on the connecting structure. The rotation of the first portion may be, for example, about a point on the connecting structure. For example, the first portion may be substantially circular and may be configured to rotate about a centre of the circle.

The torque sensor element may comprise a first arm connected to the first portion, wherein the first arm is configured to move by an amount determined by the degree of relative rotation between the outer frame and the inner frame caused by the torque applied to the joint.

The first arm can act to translate a movement of the first portion into a larger movement of the arm. For example, a rotational movement of the first portion may be translated into a larger movement of a free end of the arm. The free end of the arm may be remote from the first portion.

The first arm may extend in a direction away from the inner frame. The outer frame may comprise a gap. The first arm may extend through the gap.

By extending away from the inner frame, the first arm may be allowed to extend further from the first portion. This may allow the first arm to amplify the movement of the first portion to a greater degree. For example, the first arm may translate a relatively small rotational movement of the first portion into a larger translational movement of a free end of the first arm. If the outer frame comprises a gap, the first arm may extend through the gap. This may provide a convenient way to make the first arm longer and to amplify a rotational movement of the first portion to a greater degree. In some examples, the gap in the outer frame is a complete break such that the outer frame is split into separate portions. In other examples, the gap in the outer frame may comprise a portion at which the outer frame is thinner. In such examples the first arm can extend over or under the thinner portion of the outer frame which forms the gap. The first arm may be arranged, for example comprising a complementary thinner portion, to allow the first arm to pass over or under the thinner portion of the outer frame.

The connecting structure may comprise at least one linking element linking the first member or the second member to the first portion and configured to facilitate the movement of the first portion when the torque is applied to the joint.

The connecting structure may comprise a first linking element configured to connect the first member to the first portion and a second linking element configured to connect the second member to the first portion. The first linking element and the second linking element may be configured to facilitate the movement of the first portion when the torque is applied to the joint.

The linking elements can facilitate movement of the first portion when the compliant structure is deformed due to an applied torque.

One or more beam elements may connect the outer frame to the inner frame. Each of the one or more beam elements may comprise one or more connecting members connecting the outer frame to the inner frame.

The one or more beam elements provide rigidity in the connection between the outer frame and the inner frame. The one or more beam elements mays be configured to distribute stress throughout the torque sensor element. This can allow the torque sensor element to limit the maximum stress at any point in the torque sensor element to an acceptable amount of stress. For example, the one or more beam elements may each comprise one or more members which are curved or otherwise shaped to effectively distribute stress. In some examples, two beam elements may be provided. In other examples, three beam elements are provided. In yet other examples, more than three beam elements may be provided.

The torque sensor element may comprise a third member and a fourth member, each extending between and connecting the outer frame to the inner frame, and each of the third member and the fourth being resilient and deformable to permit at least some relative rotation between the outer frame and the inner frame in response to a torque applied to the joint; and a second connecting structure extending between the third member and the fourth member, the connecting structure comprising a second portion intermediate the third member and the fourth member which is configured in response to a deformation of the third and/or fourth member to move by an amount determined by the degree of relative rotation between the outer frame and the inner frame caused by the torque applied to the joint.

Providing a second connecting structure and a second portion thereon provides another portion whose movement is indicative of the torque applied to the joint. Measurements of the movement of the second portion may be used, for example in addition to the movements of the first portion, to measure the applied torque. Certain examples may allow movements of the first portion and the second portion to both be measured and used together to measure the applied torque. This can allow for any asymmetry in the movements of the first and second portions under different directions of torque to be cancelled. Further, by providing an additional measurement point, the ratio of errors in measurements to the measured values may be reduced.

The second portion of the connecting structure may comprise a second arm configured to move by an amount determined by the degree of relative rotation between the outer frame and the inner frame caused by the torque applied to the joint.

The second arm can act to translate a movement of the second portion into a larger movement of the second arm, in a similar manner to as described above for the first arm. The second portion may also extend away from the inner frame. The outer frame may comprise a further gap. The gap may be configured to allow the second arm to extend therethrough. One or more linking elements may link the second portion to the third and fourth members respectively, in the same manner as described for the first portion.

According to a second aspect of the present invention, there is provided a torque sensor for measuring a torque applied to a joint, the torque sensor comprising: a torque sensor element according to the first aspect of the present invention; and a measuring element for measuring an amount by which the first portion of the torque sensor element moves in response to a relative rotation between the outer frame and the inner frame caused by a torque applied to the joint, thereby to measure a torque applied to the joint.

The measuring element may be configured to measure a degree of rotation of the first portion to thereby measure the torque applied to the joint.

The measuring element may comprise a magnetic measuring element configured to measure the movement of the first portion of the connecting structure by measuring a change in a magnetic field due to the movement of the first portion.

In examples where the torque sensor element comprises a second portion the torque sensor may comprise a further measuring element for measuring an amount by which the second portion of the torque sensor element moves in response to a relative rotation between the outer frame and the inner frame caused by a torque applied to the joint. The measuring element for measuring movement of the second portion may have any of the features described for the measuring element for measuring movement of the first portion.

According to a third aspect of the present invention, there is provided a robotic device comprising: a body; an end effector coupled to the body by one or more joints; a propulsion system to drive the one or more joints to control a state of the robotic device; and a torque sensor according to the second aspect of the present invention, the torque sensor being arranged to measure the torque applied to one of the one or more joints.

Further features and advantages of the invention will become apparent from the following description of preferred embodiments of the invention, given by way of example only, which is made with reference to the accompanying drawings.

DETAILED DESCRIPTION

Examples of the invention relate to a torque sensor element for a torque sensor of a robotic device. Such a robotic device may be configured to interact with humans in a human environment. However, examples of the invention may find application in other areas, such as commercial robots intended to operate in a non-human, e.g. factory, environment. Certain examples of the invention are configured to be located in a joint of a robotic device and to be used to determine torques applied on or by the joint of the robotic device. However, example torque sensors according to the invention may find application to detect torques in other parts of a robotic device, for example, to detect torques between members of the robotic device which are not configured to substantially move relative to one another during operation of the robotic device. Example torque sensors according to the present invention may also find application in torque measuring applications outside of the field of robotics. A torque sensor element will now be described, by way of example.

Figure 1:
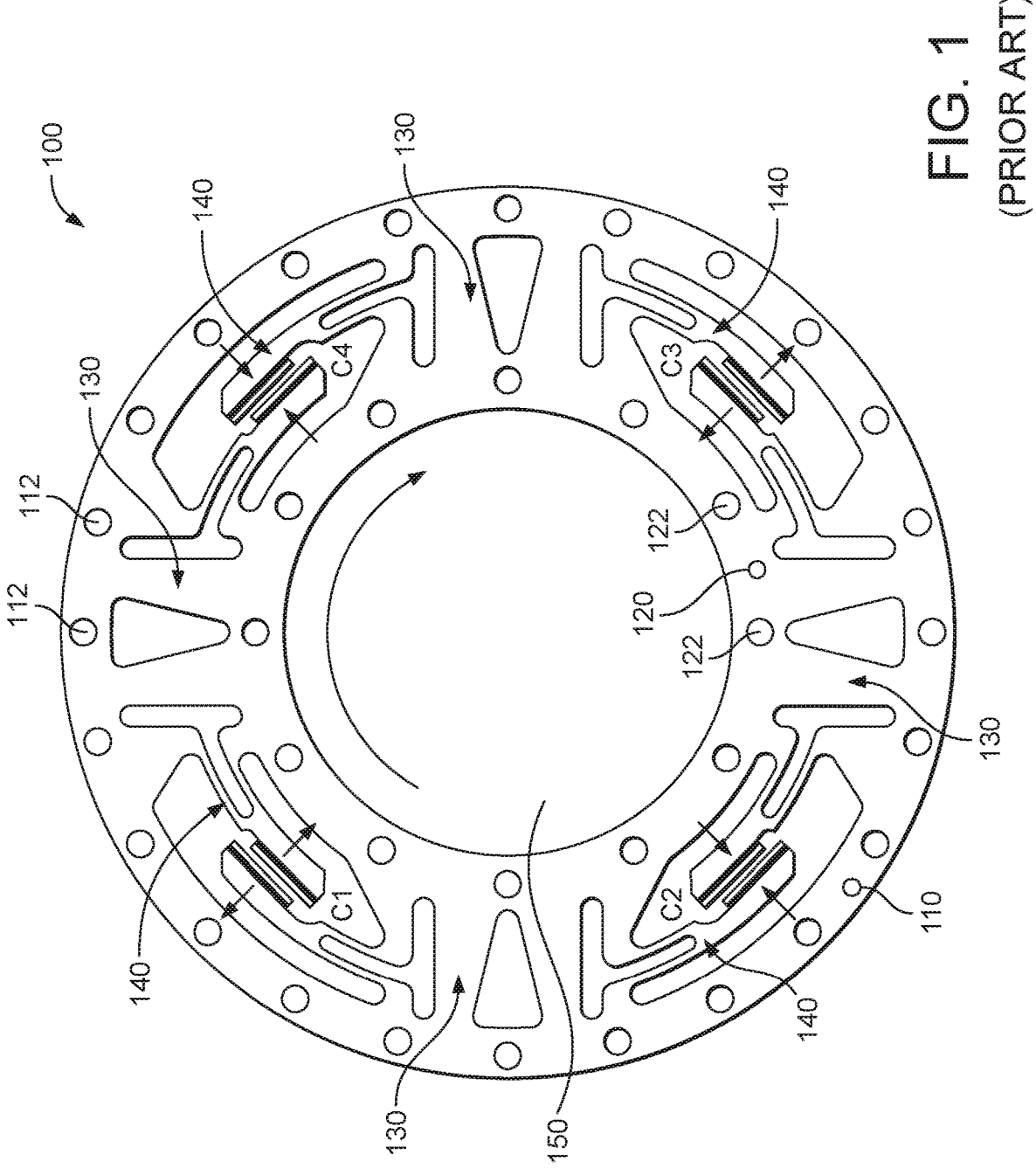
FIG. 1 is a diagrammatic representation of the example prior art torque sensor element.
Figure 2:
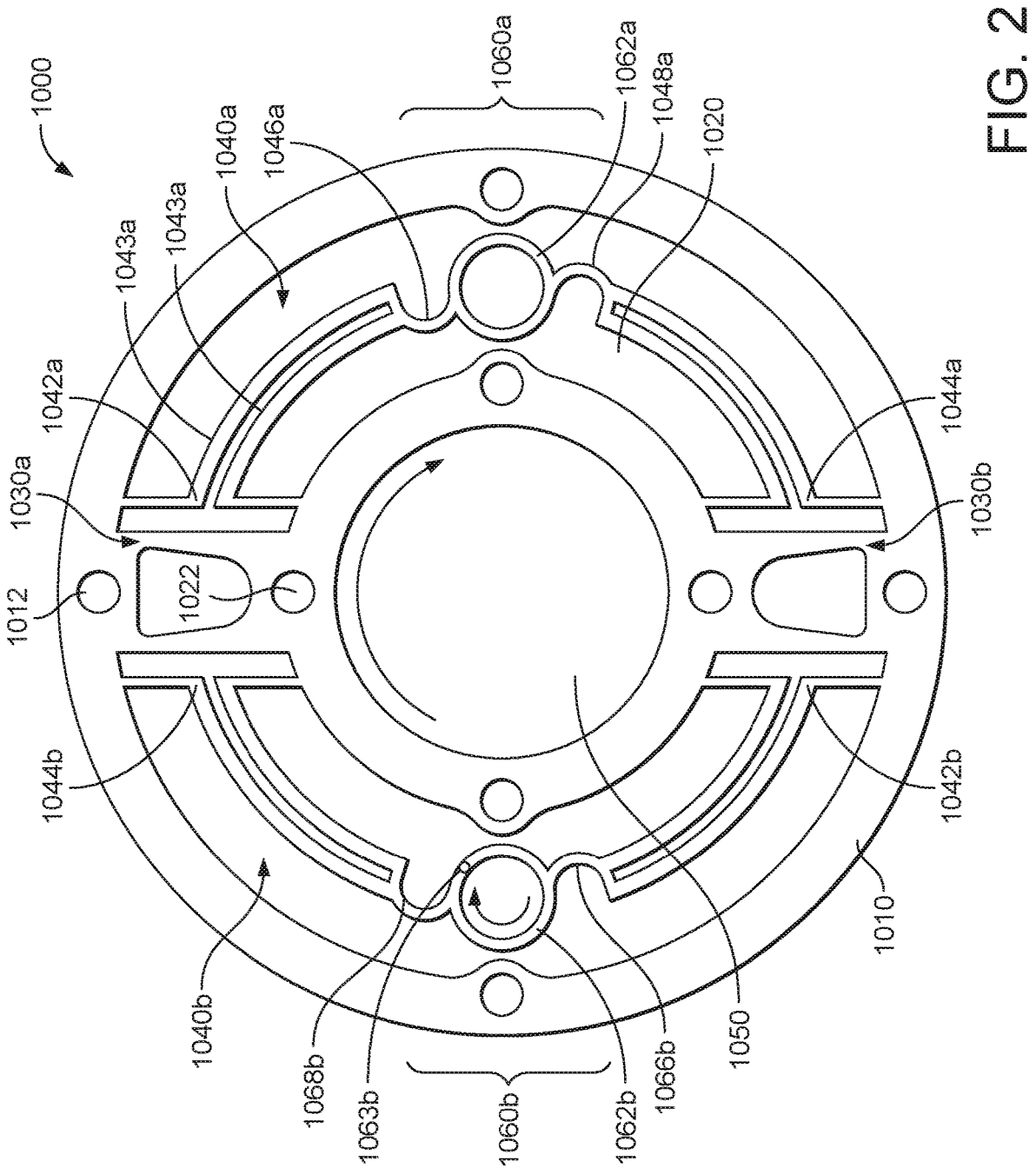
FIG. 2 is a diagrammatic representation of an example torque sensor element according to an aspect of the present invention.

FIG. 2 shows a plan view of an example of a first torque sensor element 1000 according to the present invention. The first torque sensor element 1000 is for use in a torque sensor in the joint of a robotic device (not shown in FIG. 2). The torque sensor 1000 in this example shares certain of the features of the prior art torque sensor 100 of FIG. 1. The torque sensor 1000 comprises an outer, generally annular frame 1010, an inner, generally annular frame 1020, and an arrangement of beams which connect the outer frame 1010 to the inner frame 1020. In this example, a first beam arrangement 1030a and a second beam arrangement 1030b connect the outer frame 1010 to the inner frame 1020. The torque sensor element 1000 is generally circular and generally planar. The first and second beam arrangements 1030a, 1030b are arranged on opposite sides of the torque sensor element 1000 to one another and act to provide a degree of rigidity between the outer frame 1010 and the inner frame 1020 while allowing only a small amount of rotational movement therebetween. The torque sensor element 1000 may, in some examples, be made from a metal, such as steel.

For example, the torque sensor element 1000 may be made from spring steel, e.g. from a single sheet of spring steel.

The torque sensor 100 has a central aperture 1050 to allow electrical wiring and the like to pass therethrough. The outer frame 1010 also comprises a first series of holes 1012 to allow the outer frame 1010 to be secured to a first side of the joint of the robotic device, while the inner frame 1020 comprises a second series of holes 1022 which allow the inner frame 1020 to be secured to a second side of the joint of the robotic device. When installed in a joint, the first side and second side of the joint are connected to one another via the torque sensor 1000 and any torque applied to the joint is transmitted through the torque sensor 1000.

As with the prior art torque sensor 100, the torque sensor 1000 comprises a compliant arrangement which connects the outer frame 1010 to the inner frame 1020. The compliant arrangement will be described in more detail below.

The beams 1030*a-c* connect the outer frame 1010 and the inner frame 1020 with a relatively high stiffness, which is sufficient to allow a small amount of rotational movement between the outer frame 1010 and the inner frame 1020 given an appropriate lever of applied torque. When such a rotational movement occurs, the compliant arrangement is deformed by a degree related to the degree of rotation between the outer frame 1010 and the inner frame 1020 which is itself determined by the applied torque.

The compliant arrangement in this example comprises a first section 1040*a* comprising a first member 1042*a* and a second member 1044*a* each extending between and connecting the outer frame 1010 to the inner frame 1020. The first member 1042*a* and the second member 1044*a* are each resilient and deform in response to at least some relative rotation between the outer frame 1010 and the inner frame 1020 when a torque is applied between the outer and inner frames 1010, 1020.

The first member 1042*a* is connected to the second member 1044*a* by a first connecting structure 1060*a*. The first connecting structure 1060*a* comprises a first portion 1062*a* intermediate the first member 1042*a* and the second member 1044*a*. The first portion 1062*a* is configured to move when the first member 1042*a* and/or the second member 1044*a* is deformed due to relative rotation between the outer frame 1010 and the inner frame 1020.

In this example, the movement of the first portion 1062*a* when there is relative rotation between the outer frame 1010 and the inner frame 1020 is a rotational movement. The rotational movement of the first portion 1062*a* is a result of the first portion 1062*a* being part of a connecting structure 1060*a* which connects the first member 1042*a* to the second member 1044*a*. The relative rotation between the outer frame 1010 and the inner frame 1020 can therefore be measured by measuring the rotation of the first portion 1062*a*. In this example, the first portion 1062*a* is generally circular and the first portion 1062*a* is configured to rotate about its centre when a torque is applied. In other examples, the movement of the first portion 1062*a* of the connecting structure may be a translational movement, or the movement may comprise a translational component in addition to a rotational component. The overall structure of the connecting structure may determine the type of movement which is effected by the first portion 1062*a* when the first member 1042*a* and/or second member 1044*a* are deformed.

The first member 1042*a* 1044*a* splits into two arms 1043*a* extending intermediate of the first and second member 1042*a* to join to one side of the connecting structure 1060*a*. The second member 1044*a* similarly splits into two arms (not labelled in FIG. 2) to join to the opposite side of the connecting structure 1060*a*. In addition to the first portion 1062*a*, the connecting structure 1060*a* comprises first and second linking elements 1046*a*, 1048*a*. The first member 1042*a* and the second member 1044*a* connect to respective sides of the first portion 1062*a* via the first and second linking elements 1046*a*, 1048*a*. The linking elements 1046*a*, 1048*a* are configured to allow for a deformation of the first compliant section 1040*a* due to relative rotation between the outer frame 1010 and the inner frame 1020 to result in rotation of the first portion 1062*a*. In this example, the linking elements 1046*a*, 1048*a* are shaped as arcs oriented in opposite directions to one another (respectively, oriented radially inwardly and radially outwardly) to encourage rotation of the first portion 1062*a*. In other examples, the connecting structure 1060*a* may comprise any suitable means for linking the first member 1042*a* to the second member 1044*a* and causing movement of the first portion 1062*a* when relative rotation between the outer frame 1010 and the inner frame 1020 occurs. The way in which the first portion 1062*a* is connected between the first member 1042*a* and the second member 1044*a* may affect the way in which the first portion 1062*a* moves in response to relative rotation of the outer and inner frames 1010, 1020.

The compliant arrangement connecting the outer frame 1010 to the inner frame 1020 also comprises a second compliant section 1040*b* having similar features to the first compliant section 1040*a*. The second compliant section 1040*b* comprises a third member 1042*b* and a fourth member 1044*b*, with a connecting structure 1060*b* connecting the third member 1042*b* to the fourth member 1044*b*. The connecting structure comprises a second portion 1060*b* which is configured, in the same manner as described above for the first portion 1062*a*, to cause the second portion 1062*b* to move, in a similar manner to the first portion 1062*a*, when a torque applied to the torque sensor element 1000 causes relative rotation of the outer and inner frames 1010, 1020. The features of the second section 1040*b* correspond to and operate in the same manner as has already been described above in relation to the first section 1040*a* and a description of this operation will not be repeated.

The torque sensor element 1000 is configured such that, as viewed in FIG. 2, if the outer frame 1010 remains fixed and an applied torque causes the inner frame 1020 to rotate in a clockwise direction, the first portion 1062*a* rotates about its own axis in a clockwise direction. Similarly, for the same relative rotation between the outer frame 1010 and the inner frame 1020, the second portion 1062*b* also rotates about its own axis in a clockwise direction. The directions of these rotations are shown by arrows in FIG. 2. If a torque causes a relative rotation between the outer frame 1010 the inner frame 1020 which is in the opposite sense to that described above, then the first and the second portions 1060*a*, 1060*b* rotate in an anti-clockwise direction with respect to their own axes.

In order to measure a torque applied to a joint in which the torque sensor element 1000 is installed, a measuring element (not shown) is used to measure the degree of movement, in this example, rotation, of one of or both of the first portion 1062*a* and the second portion 1062*b*. For example, to measure a degree of rotation of the second portion 1062*b*, a measuring element may be used to measure a movement of a point 1063*b* on the second portion 1062*b*. In some examples, a magnetic measuring element is used to measure the movement of the second portion 1062*b*. In one such example, a diametrically magnetised magnet (not shown in FIG. 2) i.e. having north and south poles on a single face rather than on opposite faces, is attached to the first portion 1062*a*. In this example, a rotary position sensor (not shown) is then positioned to measure the rotation of the diametrically magnetised magnet. The rotary position sensor may comprise an array of Hall sensors, for example, an array of five Hall sensors. Each Hall sensor is configured to sense the magnetic field of the diametrically magnetised magnet and the orientation of the magnet, and thus the rotation of the first portion 1062*a*, can be determined from the magnetic field measurements obtained by the Hall sensors.

The above-described compliant arrangement of the torque sensor element 1000 allows for a small degree of rotation between the outer frame 1010 and inner frame 1020 to result in a movement of the first portion 1062*a* and the second portion 1062*b* which can be measured to determine a torque applied to the torque sensor element. In particular, the first portion 1062*a* and the second portion 1062*b* being located on connecting structures 1060*a*, 1060*b* between respective pairs of deformable members causes a rotational movement of the first portion 1062*a* and the second portion 1062*b*. This can be contrasted with the prior art arrangement of FIG. 1, which relies on measuring a spacing or an overlap between adjacent flexures 140. The provision of a connecting section between the first member 1042*a* and the second member 1044*a* provides this movement of the first portion 1062*a* which provides a reliable way of translating the relative rotation of the outer and inner frames 1010, 1020 into a measurable, e.g. rotational, movement.

In this example, the beam arrangements 1030*a*, 1030*b* are configured to maintain a suitable degree of rigidity to allow the torque sensor element 1000 to effectively transmit torques without a large degree of movement between the outer frame 1010 and inner frame 1020 while the small rotational movements between the outer frame 1010 and inner frame 1020 are translated into measurable rotational movements of the first portion 1062*a* and the second portion 1062*b*, in this example, about their own axes. The connecting structure may also contribute to increasing the rigidity of the connection between the outer frame 1010 and the inner frame 1020 while providing this measurable rotational movement.

In some examples, an amplifying arrangement is provided to amplify the movement of one or both of the first and second connecting structures. The amplifying arrangement may, for example, comprise a projection or an extension, such as an arm, which extends from a given one of the first portion and the second portion. Such a projection or extension may be configured to amplify the movement of the given one of the first portion and the second portion to which it is connected. Therefore, for example, for a given degree of movement of the first portion, a projection connected to the first portion may be configured to move by a larger degree. A similar projection connected to the second portion may be configured to amplify the movement of the second portion in a similar manner.

Figure 3:
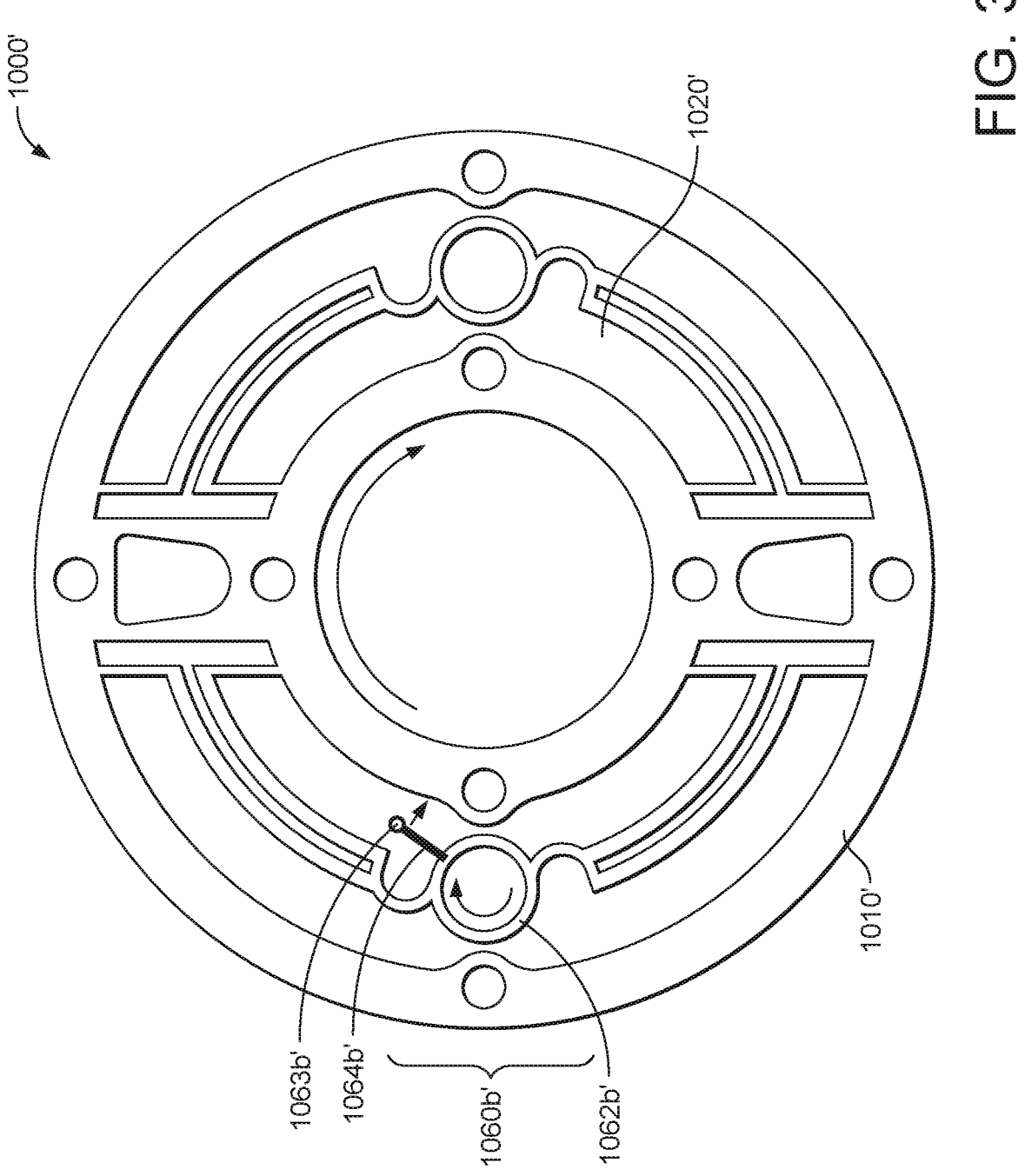
FIG. 3 is a diagrammatic representation of another example torque sensor element according to an aspect of the present invention.

FIG. 3 shows an example torque sensor element 1000' which is a variation on the first torque sensor element 1000 of FIG. 2. The torque sensor element 1000' has the features of the first torque sensor element 1000 and additionally comprises an arm 1064*b*' which extends from the second portion 1062*b*'. The arm 1064*b*' extends away from the second portion 1062*b*' and terminates in a free end 1063*b*'. A movement of the arm, for example of the free end 1063*b*', can be measured to determine the applied torque. The direction of rotation of the second portion 1062*b*' and the movement of the free end 1063*b*' for the example in which the inner frame 1020' rotates in a clockwise direction relative to the outer frame 1010' is illustrated by arrows in FIG. 3. The arm 1064*b*' is configured to provide a displacement of the free end 1063*b*' which is greater than a displacement of a point on the second portion 1062*b*' (such as the point 1063*b* of the torque sensor element 1000 of FIG. 2) for a given degree of rotation of the second portion 1062*b*'. The movement of the free end 1063*b*' is therefore an amplification of the movement of the second portion 1062*b*' with the amplification being provided by the arm 1064*b*'. This allows for a small degree of relative rotational movement between the outer frame 1010' and the inner frame 1020' to be translated into a relatively large displacement of the free end 1063*b*'. This is illustrated by the arrows in FIG. 3 which show the rotation of the second portion 1062*b*' and the movement of the free end 1063*b*'. Thus, a more sensitive torque sensor which maintains the same degree of rigidity can be provided. Equally, rigidity may be increased while maintaining the same degree of sensitivity.

Although the example of FIG. 3 comprises only one arm 1064*b*' connected to the second portion 1062*b*, in other examples, a similar arm may be provided on the first portion 1062*b*' to amplify the movement of the first portion 1062*b*. In examples, one of or both of the first portion 1062*b*' and the second portion 1062*b*' may have such an arm attached thereto.

Figure 4:
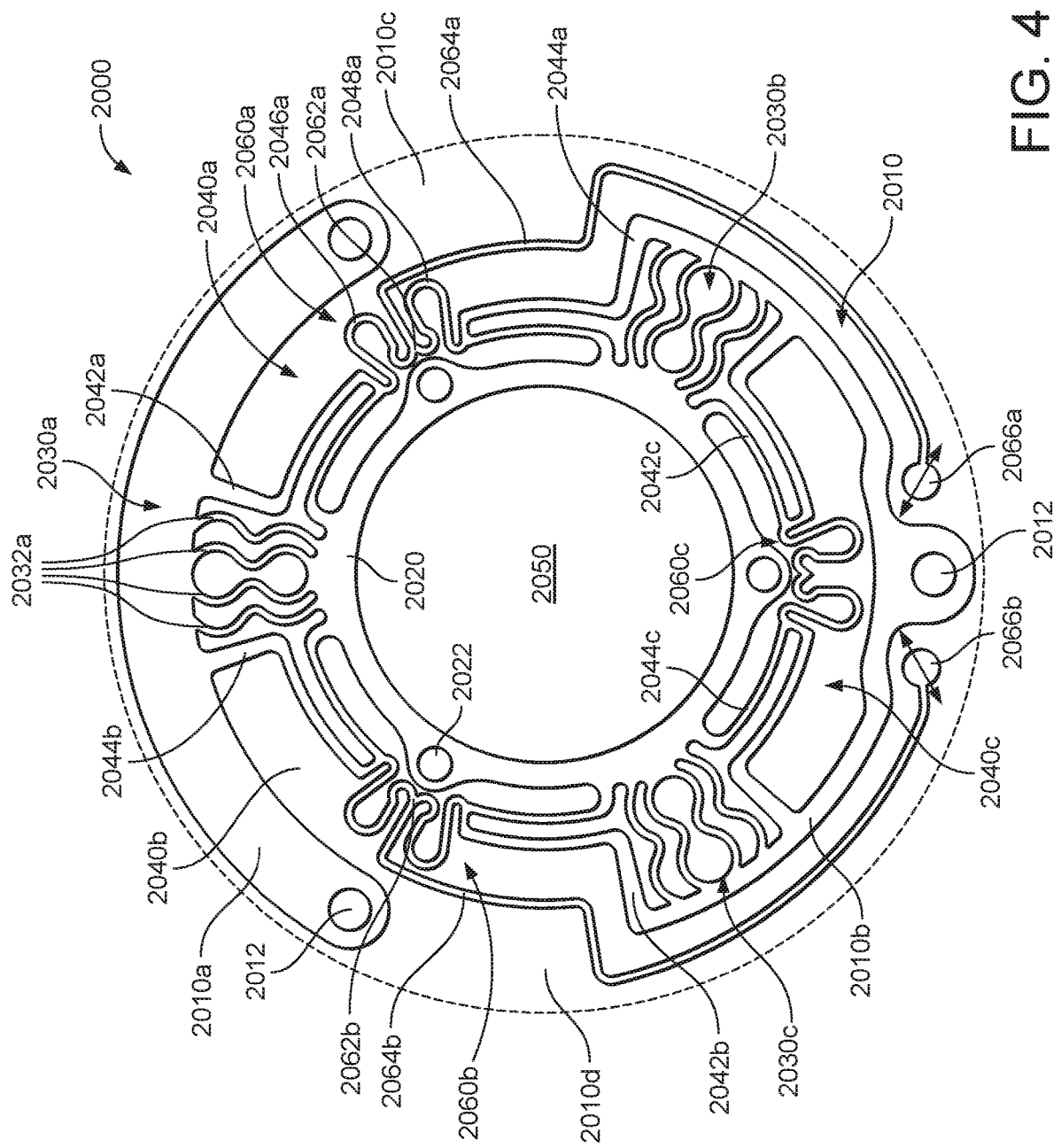
FIG. 4 is a diagrammatic representation of another example torque sensor element according to an aspect of the present invention.

FIG. 4 shows a second torque sensor element 2000 according to an example of the present invention. The second torque sensor element 2000 shares many of the features of the first torque sensor element 1000 and such features are indicated with like figure references.

The second torque sensor element 2000 comprises an outer frame 2010 which comprises two separate sections, a first outer frame section 2010*a* and a second outer frame section 2010*b*. The outer frame 2010 is thus discontinuous and does not form a full ring around the inner frame 2020 but, rather, defines two discontinuities or 'gaps' comprising a first gap 2010*c* and a second gap 2010*d* situated on opposite sides of the outer frame 2010. The first outer frame section 2010*a* and the second outer frame section 2010*b* are configured to be rigidly attached to the same side of a joint (not shown in FIG. 4) to remain in a fixed position with respect to one another. In this example, the first outer frame section 2010*a* has a width which is generally larger than a width of the second outer frame section 2010*b*. The outer frame 2010 comprises a first series of holes 2012 for securing the outer frame 2010 to a first side of a joint while the inner frame 2020 comprises second series of holes 2022 for securing the inner frame 2020 to a second side of the joint.

The outer frame 2010 is connected to the inner frame 2020 by a plurality of beam arrangements 2030*a*, 2030*b*, 2030*c*. The beam arrangements 2030*a-c* are configured to distribute stress due to an applied torque throughout the torque sensor element 2000. This allows the maximum stress experienced by any single part of the torque sensor element 2000 to be limited. For example, it has been found that, in an example when the torque sensor element 2000 comprises spring steel, an applied torque of 1.6 Nm produces a maximum stress of 180 MPa in the torque sensor element 2000. Spring steel typically has a yield stress of around 1200 MPa, though this may vary with the composition of the spring steel. In any case, it can be seen that in this arrangement the maximum stress at this level of applied torque is far below the typical yield stress of spring steel. The values given in this example are for a 0.8 mm spring steel torque sensor element 2000. Consequently, even at high torques, the maximum stress is kept well below the level of stress which might result in permanent material damage to the torque sensor element 2000.

In examples, the torque sensor element 2000 may be configured to deform by a given maximum amount when a given maximum torque is applied thereto. For example, the torque sensor element 2000 may be made to deform by a particular amount under a given torque based on the intended application of the torque sensor element 2000. Different examples of the torque sensor element 2000 made for different applications and different corresponding maximum torques may be configured to exhibit the same maximum deformation under those different maximum torques. For example, an example of the torque sensor element 2000 which is intended to be installed in a shoulder joint, where the maximum torque applied to the torque sensor element 2000 will be large, may be configured to deform less under a given torque than an example of the torque sensor element 2000 which is intended to be installed in a wrist joint, where the maximum applied torques will be smaller. The amount by which the example torque sensor elements 2000 deform under a given torque may be configured such that the same maximum deformation is exhibited under the respective maximum torque expected to be applied to a given torque sensor element 2000. The thickness of the torque sensor element 2000 may be selected to provide the desired resistance to deformation under applied torques. For example, where the torque sensor element 2000 is made of spring steel, to achieve the same maximum deformation under the maximum applied torque in each application, the torque sensor element 2000 may have a thickness of around 4 mm when intended for use in a shoulder joint and around 0.5 mm when intended for use in a wrist joint.

In the example of FIG. 4, there are three beam arrangements 2030a-c which are spaced equidistantly around the inner frame 2020. In other examples, there may be a different number of beam arrangements, such as two or greater than three beam arrangements. In the example shown in FIG. 4, each of the beam arrangements 2030a-c comprises a set of connecting members, e.g. the first beam arrangement 2030a comprises a set of connecting members 2032a, which each connect the outer frame 2010 to the inner frame 2020. In this example, each of the connecting members 2032a of the first beam arrangement 2030a and of the other beam arrangements 2030b-c has a curved shape which defines two lobes. In this example, each of the beam arrangements 2030a-c comprises four such connecting members. Other examples may have different numbers of connecting members in each beam arrangement. Further, in other examples, the connecting members may be shaped differently, for example comprising a different number of lobes such as one lobe or more than two lobes. The lobes may be absent in some examples, for example one or more of the connecting members may be substantially linear.

The second torque sensor element 2000 comprises a compliant arrangement comprising a first compliant section 2040a between the first beam arrangement 2030a and the second beam arrangement 2030b and a second compliant section 2040b between the first beam arrangement 2030a and the third beam arrangement 2030c. Since the second torque sensor element 2000 comprises three beam arrangements 2030a-c, a third compliant section 2040c is situated between the second beam arrangement 2030b and the third beam arrangement 2030c. The first compliant section 2040a comprises a first member 2042a and a second member 2044a connected by a first connecting structure 2060a. Similarly, the second compliant section 2040b comprises a third member 2042b and a fourth member 2044b connected by a second connecting structure 2060b. The third compliant section 2040c comprises a fifth member 2042c and a sixth member 2044c connected by a third connecting structure 2060c.

The first connecting structure 2060a comprises a first portion 2062a intermediate the first member 2042a and the second member 2044a. Similarly, the second connecting structure 2060b comprises a second portion 2062b intermediate the third member 2042b and the fourth member 2044b. The first connecting section 2060a comprises linking elements 2046a, 2048a which act to provide flexibility and resilience in the connecting structure 2060a. This facilitates a deformation of the first member 2042a and the second member 2044a being translated into a movement, in this example, a rotation, of the first portion 2062a. The second connecting section 2060b comprises similar linking elements (not labelled for the sake of clarity) which act in the same manner to facilitate movement of the second portion 2062b. In this example, each of the linking elements 2046a, 2048a are shaped as lobes either side of the first portion 2062a. The linking elements either side of the second portion 2062b are similarly shaped. Differently shaped linking members may effect a different type of movement of the first and second portions 2046a, 2048a. For example, the linking members either side of the first portion 2062a may be shaped to cause the first portion to affect a translational motion in, e.g., in a generally circumferential direction.

As with the examples of FIG. 2 and FIG. 3, the first portion 2062a and the second portion 2062b are configured to move when there is relative rotation between the outer frame 2010 and the inner frame 2020 due to an applied torque. Measurement of the degree of movement of the first portion 2062a and the second portion 2062b allows the applied torque to be measured. In this example, the movement of the first portion 2060a and the second portion 2060b comprises at least a rotational component.

In the example shown in FIG. 4, a first arm 2064a is connected to the first portion 2062a. The first arm 2064a extends away from the first portion 2062a, in this example, in a direction radially outwardly, away from the inner frame 2020. The first arm 2062a terminates in a free end 2066a. The first arm 2064a translates the rotational movement of the first portion 2062a into a displacement of the free end 2066a. The displacement of the free end 2066a can then be measured to measure an applied torque. As can be seen in FIG. 4, the first arm 2064a extends a significant distance from the first portion 2062a. This amplifies the movement of the free end 2066a which is produced for a given degree of rotation of the first portion 2062a in a similar manner to as described for the arm 1064b' torque sensor element 1000' of FIG. 3.

The first arm 2064a, in examples, may extend through a gap in the outer frame. This allows the first arm 2064a to extend further from the first portion 2062a to thereby provide a greater displacement of the free end 2066a under a given torque.

FIG. 4 shows an example in which the first arm 2064a extends through the first gap 2010c in the outer frame. In this example, the first arm 2064a comprises two substantially right-angle bends such that the first arm 2064a extends through the first gap 2010c. The first arm 2064a comprises a further substantially right-angle bend and thereafter extends in a substantially circumferential direction such that the first arm 2064a terminates in the first free end 2066a near a centre of the second section 2010b of the outer frame 2010.

The second connecting structure 2060*b* comprises a second portion 2062*b* and a second arm 2064*b* extending from the second portion 2062*b*. The second arm 2064*b* extends in a similar manner to as described above for the first arm 2064*a* and may have any of the features described for the first arm 2064*a*. The second connecting structure also comprises linking elements either side of the second portion 2062*b* (which are not labelled in FIG. 4 for the sake of clarity) which are similar to the linking elements 2046*a*, 2048*a* either side of the first portion 2062*a*. The second arm 2064*a* extends through the second gap 2010*d* in the outer frame and terminates in a second free end 2066*b*. The second free end 2066*b* near is located near a centre of the second section 2010*b* of the outer frame. In the example shown in FIG. 4 the free ends 2066*a*, 2066*b* are substantially circular, however they may be a different shape in other examples.

The third connecting structure 2060*c* of the third compliant section 2040*c* comprises similar linking elements intermediate the fifth and sixth members 2042*c*, 2044*c* which act to increase the overall compliance of the compliant arrangement and thereby facilitate movement of the first arm 2064*a* and the second arm 2064*b* when a torque causes relative rotation between the outer frame 2010 and the inner frame 2020. The linking elements of the third connecting structure 2060*c*, in this example, comprise similar lobes to the linking elements 2046*a*, 2048*a* of the first connecting structure 2060*a*.

As mentioned above, the first and second free ends 2066*a*, 2066*b* are configured to translate a relative rotation between the outer frame 2010 and inner frame 2020 into a displacement which can be measured to measure a torque applied to the torque sensor element 2000. In this example, the movement of the first and second free ends 2066*a*, 2066*b* when a torque is applied is a substantially linear movement along respective axes shown by the arrows located at the first free end 2066*a* and the second free end 2066*b* in FIG. 4. As can be seen from FIG. 4, in this example, the axes along with the first and second free ends 2066*a*, 2066*b* are configured to move are angled slightly off from the direction shown as horizontal in the figure. Namely, the first free end 2066*a* is configured to move substantially along a tangent to a circle centred on 2062*a* and passing through the centre of the first free end 2066*a*. Similarly, the second free end 2066*b* is configured to move substantially along a tangent to a circle centred on 2062*b* and passing through the centre of the second free end 2066*b*.

When the inner frame 2020 rotates clockwise with respect to the outer frame 2010, the first portion 2062*a* and the second portion 2062*b* each are also caused to rotate in a clockwise direction. The result is that each of the free ends 2066*a*, 2066*b* moves along its respective axis in a right-to-left direction when the inner frame 2020 rotates clockwise with respect to the outer frame 2010. When the inner frame 2020 rotates anti-clockwise with respect to the outer frame 2010 the direction of rotation of the first and second portions 2062*a*, 2062*b* is reversed and the first and the second free ends 2066*a*, 2066*b* move in a left-to-right direction along their respective axes.

In examples, a measuring element may be placed on and/or adjacent the free ends 2066*a*, 2066*b* and used to measure the movement of the free ends 2066*a*, 2066*b*.

Figure 5:
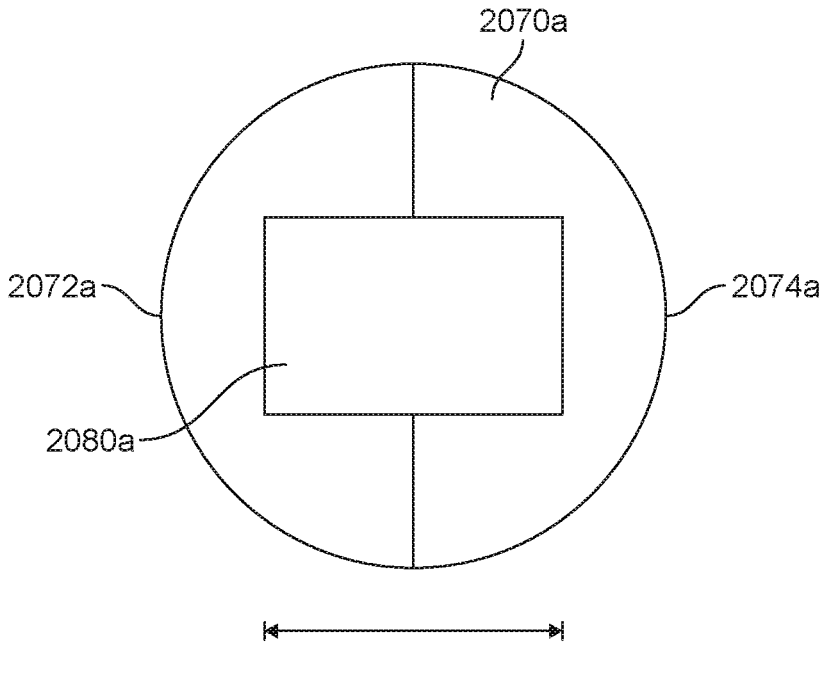
FIG. 5 is a diagrammatic representation of an example measuring element for use in a torque sensor according to an aspect of the present invention.

FIG. 5 shows a magnetic measuring element for measuring movement of the first free end 2066*a* of the torque sensor element 2000. In the example shown in FIG. 5, to measure movement of the first free end 2066*a*, a diametrically magnetised magnet 2070*a* is attached to the first free end 2066*a* (not shown in FIG. 5). The magnet 2070*a* comprises a north pole 2072*a* and a south pole 2074*a*. A magnetic sensor 2080*a* is placed adjacent the magnet 2070*a*. The magnetic sensor 2080*a* may be a Hall sensor. The magnetic sensor 2080*a* is kept in a fixed location with respect to the outer frame 2010 (also not shown in FIG. 5). For example, the magnetic sensor 2080*a* may be secured to the outer frame 2010. In one example, the magnetic sensor 2080*a* is placed around 1 mm above the magnet 2070*a*. As the first free end 2066*a* and the magnet 2070*a* attached thereto move due to an applied torque, the magnetic sensor 2080*a* senses the change in magnetic field due to the movement of the magnet 2070*a*. Various electrical connections (not shown) may be provided to the magnetic sensor 2080*a* in order to allow the magnetic sensor 2080*a* to measure the magnetic field of the magnet 2070*a*. A similar magnetic measuring arrangement may be used to measure movement of the second free end 2066*b*.

In other examples, any suitable type of measuring element may be used to measure the movement of the first and second free ends 2066*a*, 2066*b*. For example, a capacitive sensor, or optical sensor may be used.

Examples where the movement of both of the free ends 2066*a*, 2066*b* is measured to measure an applied torque allow for certain advantages in that the movement of each arm 2064*a*, 2064*b* may not be perfectly symmetric for clockwise and anti-clockwise torques. However, since the arms 2064*a*, 2064*b* always undergo opposite displacements with respect to the centre of the torque sensor element 2000 under an applied torque (i.e. when the first arm 2064*a* swings outwardly the second arm 2064*b* swings inwardly, and vice-versa) any error due to this asymmetry may be cancelled out by measuring the movement of both of the free ends 2066*a*, 2066*b*. Further, by taking more points of measurement, e.g. two points of measurement rather than one, the ratio between the error (i.e. the uncertainty) and the measured value is decreased.

This arrangement allows for the movement of the free ends 2066*a*, 2066*b* of the arms 2064*a*, 2064*b* to be significantly amplified when compared to the relative rotational movement between the outer frame 2010 and the inner frame 2020 which causes the movement of the arms 2064*a*, 2064*b*. For example, the fact that the outer frame 2010 is discontinuous allows the arms 2062*a*, 2062*b* to extend radially outwardly through one of the gaps 2010*c*, 2010*d* in the outer frame 2010. This allows for longer arms which acts to provide a greater displacement of the free ends 2066*a*, 2066*b* of the arms for a given degree of relative rotation between the outer and inner frames 2010, 2020.

For these reasons, the movement of the arms 2064*a*, 2064*b* is highly sensitive to applied torques. Further, the discontinuous nature of the outer frame 2010 allows the arms 2064*a*, 2064*b* to extend in such a way that their free ends 2066*a*, 2066*b* are conveniently located for their movement to be measured by a suitable measuring element. This contributes to the torque sensor element 2000 allowing for efficient use of space within the joint since the measuring element or measuring elements can be placed in a convenient location.

In examples, a torque sensor element according to the invention can be provided which fits within the footprint of prior art torque sensor elements, such as that shown in FIG. 1. For example, a dotted line in FIG. 4 represents the footprint of the prior art torque sensor of FIG. 1, according to one example. It can be seen that even with the arms 2064*a*, 2064*b* extending radially outwardly of the outer frame 2010, the structure of the torque sensor element 2000 is such that it can still fit generally within this silhouette.

This is achieved, in this example, by the second outer section 2010b being narrower than the upper outer section 2010a and the arm 2064a extending in a substantially circumferential direction and being sufficiently narrow that the arm 2064a, despite its movement being an amplification of the movement of the first portion 2062a, remains generally within the region that would have been filled by the lower outer frame section 2010b if the lower outer frame section 2010b had the same width as the upper outer frame section 2010a. In this example, the same is true for the second arm 2064b. Accordingly, certain example torque sensor elements according to the present invention, such as that shown in FIG. 4, can provide a greater degree of sensitivity by virtue of the elongate arms 2064a, 2064b while still being able to be accommodated in existing or standard sizes of joint.

In an example implementation of the second torque sensor element 2000, an applied torque of 1.6 Nmm, resulting in a displacement of the inner frame 2020 compared to the outer frame of around 0.070 mm, results in a displacement of one or both of the first free end 2066a and the second free end 2066b of around 1.38 mm. Thus, the movement of the free ends 2066a, 2066b is around a 20 times amplification of the movement between the outer and inner frames 2010, 2020. In contrast, under the same applied torque, an implementation of the prior art arrangement of FIG. 1 may produce a displacement of the plates of the capacitive sensors C1-C4 which is around 9 times larger than the displacement between the outer ring 110 and inner ring 120. Accordingly, certain examples according to the invention provide an amplification of the relative rotation of the outer and inner frame which results in an increase in sensitivity to applied torques, as mentioned above.

At the same time as providing an amplified movement which provides more sensitive torque measurements, the overall structure of example torque sensor elements according to the invention, such as the torque sensor element 2000, provides a sufficient degree of rigidity to allow for effective transmission of a torque in the joint. Further, stress may be efficiently distributed throughout example torque sensor elements by the provision of beam arrangements, e.g. beam arrangements 2030a-c, such that the possibility of material strain is limited. This may be achieved even in examples where there are gaps in the outer frame 2010, such as in the example of FIG. 4. This allows for the torque sensor element 2000 to minimise hysteresis caused by material stresses due to applied torques. The torque sensor element 2000 therefore allows for accurate and reproducible torque measurements to be made.

Further, certain example torque sensor elements according to the invention, such as the second torque sensor element 2000, allow for a low degree of deformation of the inner frame 2020 under typical torques which may be experienced in a robotic joint. For example, in the same example implementation of the second torque sensor element 2000 which is discussed above, wherein the torque sensor element 2000 is formed of a sheet of spring steel, when the outer frame 2010 is fixed in place, the maximum deformation of the inner frame 2020 is less than 0.07 mm under an applied torque of 1.6 Nm. This low degree of deformation of the inner frame 2020 is advantageous because it provides more effective control of the position of the second side of the joint with respect to the first side of the joint. For example, in a joint in an arm of a robotic device, deformation of the inner and/or outer frame of a torque sensor in the joint will negatively affect how the position of the arm can be controlled.

Though, in the example shown in FIG. 4, the gaps 2010c, 2010d in the outer frame 2010 are points where there is a complete break in the outer frame 2010, in other examples, the outer frame may comprise portions at which the outer frame 2010 is thinner such that an arm can extend over or under a given thinner portion of the outer frame 2010. Thus, the arms 2064a, 2064b may be configured to extend radially outward of the outer frame 2010 even when the gaps between the sections of the outer frame 2010 are not complete breaks in the outer frame 2010. In such examples, the arms 2064a, 2064b may also be thinner to allow the arms to move over or under the thinner portions of the outer frame. For example, the thinner portions of the outer frame may be substantially half the thickness of the rest of the outer frame. The arms may also be substantially half the thickness of the rest of the outer frame to allow the arms to move over or under the thinner portions while the total thickness of the torque sensor element may be unchanged.

In some examples, two measuring elements are provided, each measuring element being to measure the movement of a respective one of the first portions 2062a, 2062b, e.g. to measure movement of the free ends 2066a, 2066b of the arms, as described above. Providing two sensor elements may allow for more reliable torque measurements to be made by taking into account the movement of both the first arm 2064a and the second arm 2064b. For example, the measurements may be averaged or a difference between the measurements may be taken, which may, for example, aid with the cancellation of noise. In other examples, torque measurements may be based on measurements of the movement of only one of the first arm and the second arm, or, generally, only one of the first portion and the second portion. In such examples, there may be only one measuring element.

Although the example of FIG. 4 comprises two arms 2064a, 2064b, in other examples the torque sensor element may comprise only one arm, e.g. one of the first arm 2064a and the second arm 2064b, extending from one of the first portion 2062a and the second portion 2062b. In other examples, the torque sensor element may comprise more than two arms and torque measurements may be based on measurements of the movement of each of the more than two arms. For example, a third arm (not shown) may be connected to a centre of the third connecting section 2060c and movement of the third arm may be measured to provide torque measurements, alone or in combination with measurements of the movement of further arms, such as the first and second arms. In some such examples, further gaps in the outer frame may be provided to allow any further arms to extend radially outward of the outer frame.

Though in the example shown in FIG. 4 each of the arms 2064a, 2064b extends through a gap 2010c, 2010d in the outer frame 2010, in other examples, an arm may be provided which extends from, for example, the first portion or the second portion but which does not extend radially to outside of the outer frame 2010. For example, an arm may extend from one of the first portion and the second portion in any direction, e.g. in a radial direction or in a generally circumferential direction, while remaining radially inward of the outer frame. In some examples, the outer frame and/or the inner frame may be shaped to accommodate an arm extending in the space the inner frame and the outer frame. For example, the outer frame and/or the inner frame may comprise cutaway sections which provide sufficient space to accommodate an arm and allow for the arm to move when an applied torque causes a relative rotation between the inner and outer frames.

Figure 6A:
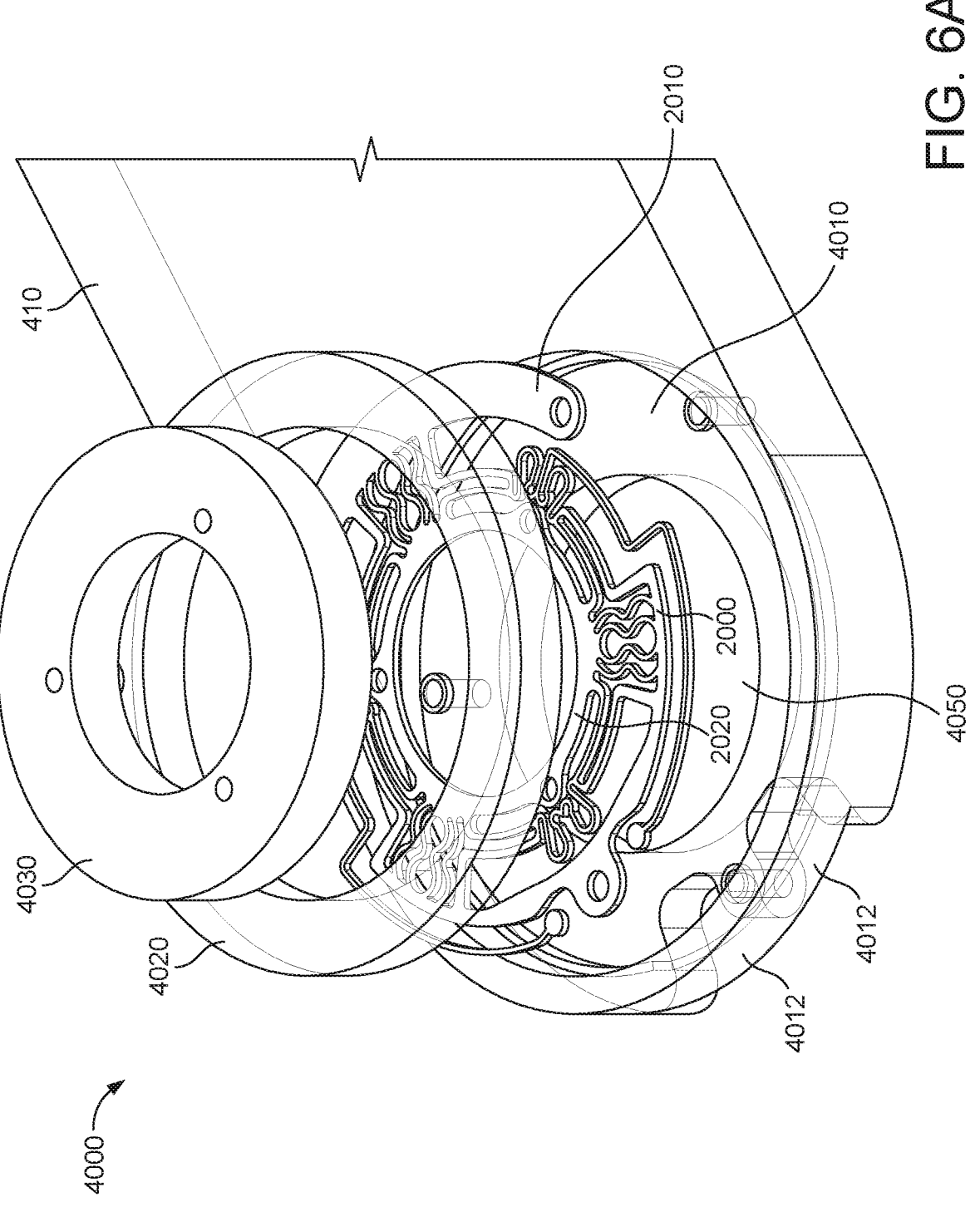
FIG. 6A shows a perspective view of an example joint comprising a torque sensor element according to an aspect of the present invention in an exploded form.
Figure 6B:
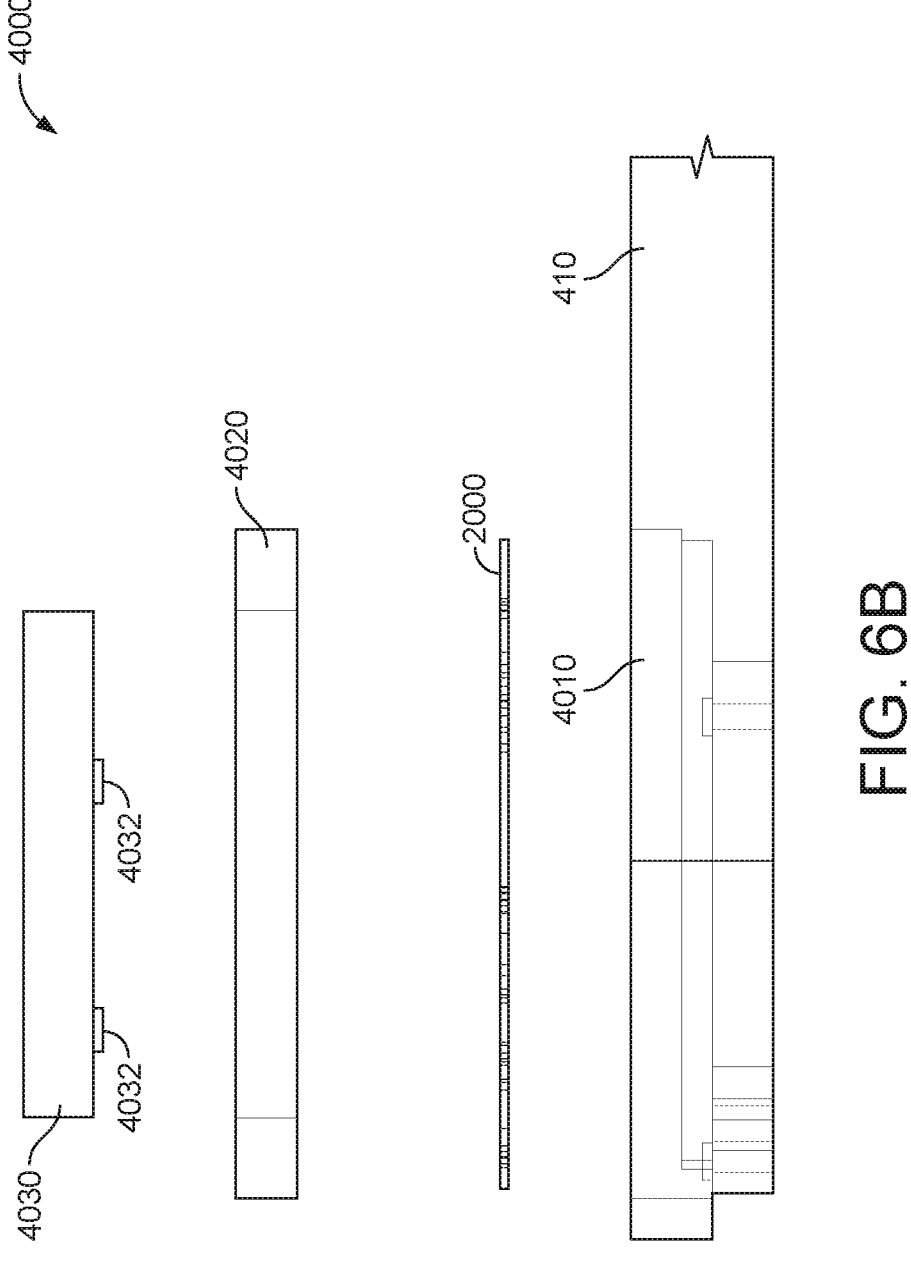
FIG. 6B shows a side view of the example joint shown in FIG. 6A, again in an exploded form.
Figure 6C:
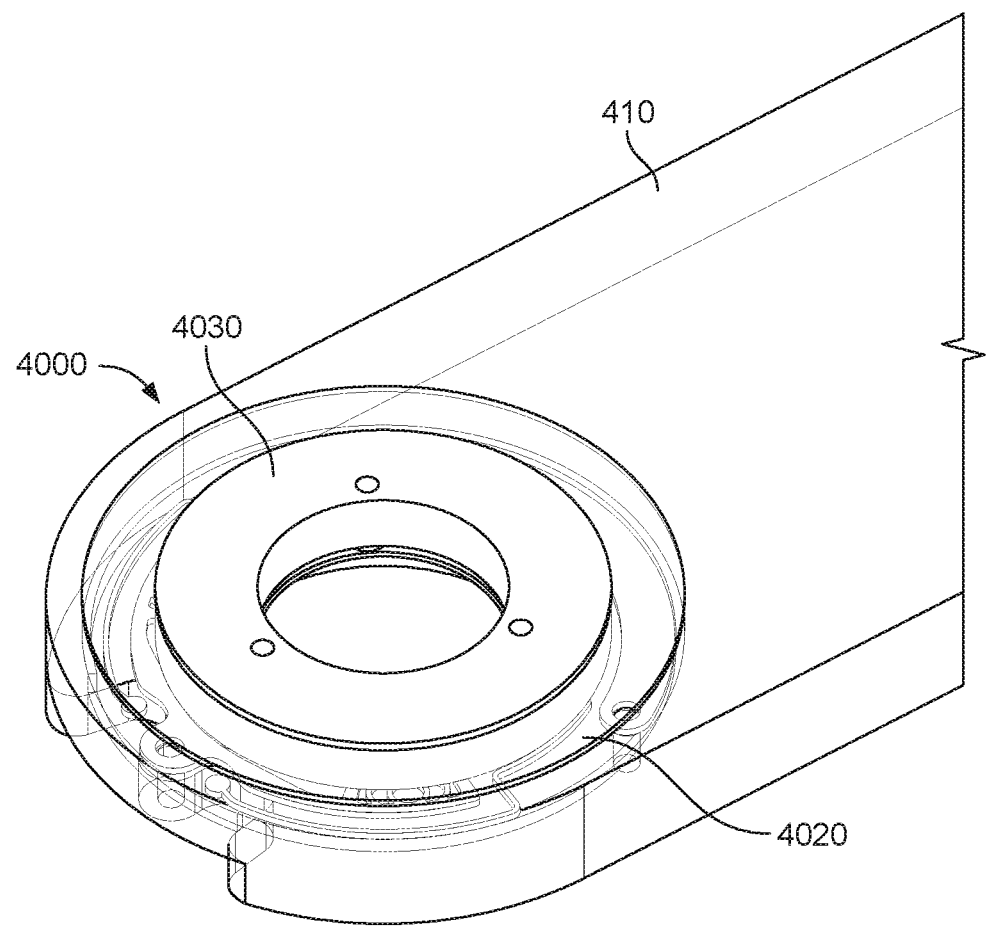
FIG. 6C shows a perspective view of the example joint shown in FIGS. 6A and 6B in a compact form.
Figure 6D:
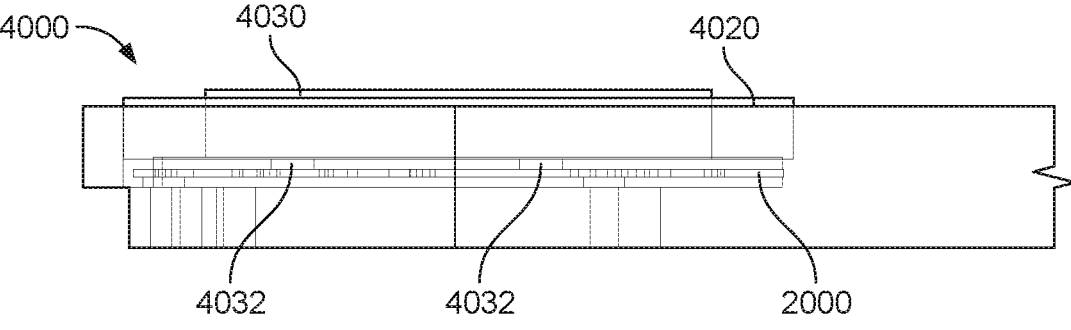
FIG. 6D shows a side view of the example joint shown in FIGS. 6A to 6C in a compact form.

FIGS. 6A-6D show an example joint 4000 comprising the second torque sensor element 2000. The joint 4000 is a joint in a robotic device and is an elbow-type joint between an upper arm 410 and a lower arm (not shown). FIG. 6A and FIG. 6B show, respectively, a perspective view and a side view of the joint 4000 in an exploded form. FIGS. 6C and 6D show, respectively, a perspective view and a side view of the joint 4000 in a compact form.

The joint 4000 comprises a cavity 4010 in the upper arm 410. The cavity 4010 is generally circular and accommodates the torque sensor element 2000 and other components of the joint 4000. The outer frame 2010 of the torque sensor element 2000, in use, is rigidly secured to the upper arm 410 by way of fixing elements (not shown) inserted through the first series of holes 2012 in the torque sensor element 2000 (see FIG. 4) and a corresponding series of holes in the cavity 4010. A bearing 4020 positioned in use above the torque sensor element 2000 acts to provide rigidity against torsional forces, i.e. forces which do not produce a torque about the vertical axis through a central aperture 4050 of the joint 4000.

An upper ring 4030 is accommodated within the bearing 4020 and sits on top of the torque sensor element 2000. The upper ring 4030 is secured, in use, to the inner frame 2020 of the torque sensor element 2000. The upper ring 4030 comprises protrusions 4032 on its lower surface (best seen in FIG. 6B) which facilitate connection of the upper ring 4030 to the inner frame 2020. The protrusions 4032 comprise holes (not shown) which are complementary to the second series of holes of the inner frame 2020 and thereby allow the upper ring 4030 to be secured to the inner frame 2020. The upper ring 4030 is configured to connect to the underside of a joint motor (not shown) for controlling the elbow joint 4000. Accordingly, a torque applied by the joint motor for controlling the elbow joint 4000 are transmitted through the torque sensor element 2000. The torque produces a small rotation between the outer frame 2010 and inner frame 2020 and deforms certain parts of the torque sensor element 2000 in a manner which can be measured as described above to measure the torque applied to the joint 4000. The cavity 4010 comprises cutaway portions 4012 which allow a magnetic measuring element (see FIG. 5) to be located adjacent the first and second free ends 2066a, 2066b to measure the movement of the arms 2062a, 2062b.

It can be seen, from FIG. 6B in particular, that the torque sensor element 2000 has a low profile which is advantageous for allowing it to be accommodated in a joint of a robot, which may contain a multitude of mechanical and electronic parts. Various features of the torque sensor element 2000 which have been described above allow for this low profile. For example, the stress distributing beam arrangements 2030a-c allow for the torque sensor element 2000 to be formed of a thin sheet of steel while still having adequate resistance to stress to withstand the typical torques used in a joint of a robotic device, such as the joint 4000.

Where it is desired to measure torques in a joint subject to large torques, a torque sensor may use a plurality of torque sensor elements according to examples described herein in a stacked arrangement. For example, two of the second torque sensor element 2000 shown in FIG. 4 may be placed one on top of another (with their central apertures 2050 aligned) such that they function effectively as a single torque sensor element having twice the thickness and hence having twice the resistance to stress. Having a torque sensor element of greater thickness means that for a given torque the degree of rotation which is produced between the outer frame 2010 and inner frame 2020, and thus the sensitivity of the torque sensor, is reduced. Any number of torque sensor elements according to examples described herein may be combined in this manner to provide a torque sensor of suitable strength and sensitivity for a given application.

Figure 7:
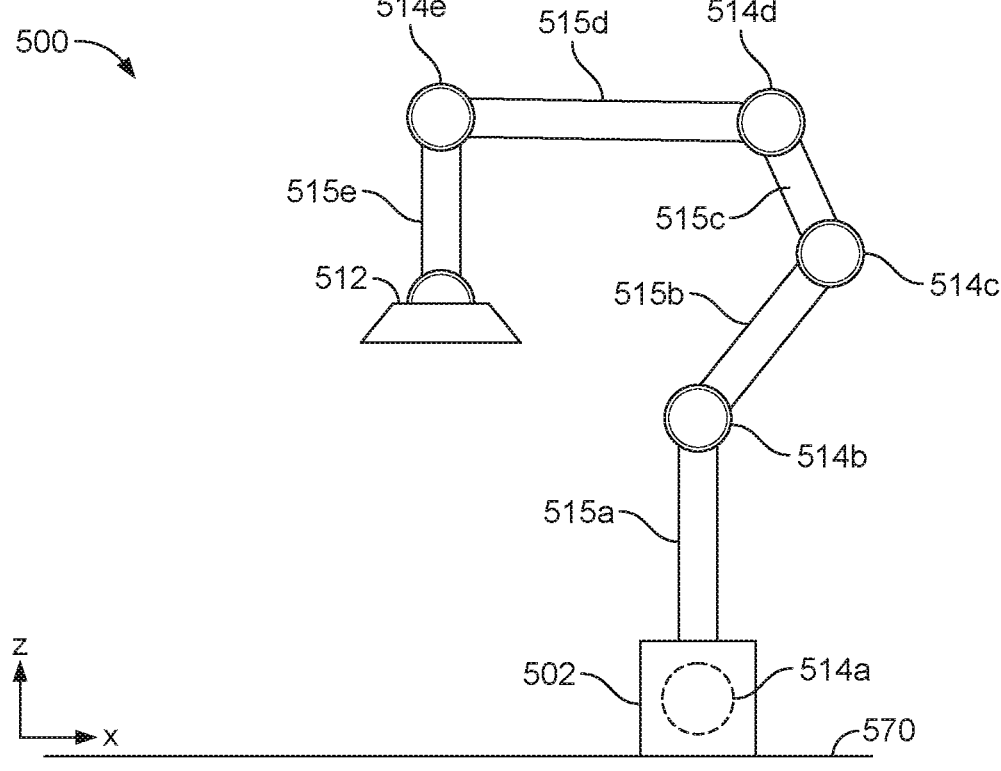
FIG. 7 shows a simplified schematic drawing of an example robotic device comprising an example torque sensor according to an aspect of the present invention.

FIG. 7 shows a simplified representation of an example robotic device 500 in which a torque sensor according to examples described herein may be used. FIG. 7 shows a side view of the robotic device 500. The robotic device 500 comprises an actuated robotic arm 505 comprising a body 502, which may also be referred to as a base link, an end effector 512 and a number of joints. The robotic device 500 also comprises a propulsion system (not shown) for actuating the one or more joints which may comprise one or more joint motors. The positions of the one or more joints are controlled to control a position and/or the orientation of the end effector 512 within Cartesian space such that the end effector 512 can be moved in the environment in which of the robotic device 500 is located. For example, where the position and orientation of the end effector 512 is controlled by the joints, the position and orientation of the end effector 512, which may in some examples be referred to as the "pose" of the end effector 512, may be controlled in a 6-dimensional space.

In the example robotic device 500, the actuated robotic arm 505 comprises 6 joints 514a-514f which are configured to allow positioning of the end effector 512 with, for example, six degrees of freedom. The robotic device 500 comprises 6 rotational joints and may thus be referred to as a 6R robot. The joints 414a-414f of the actuated robotic arm 405 are coupled by mechanical linkages or "links". FIG. 7 shows a first link 515a that mechanically couples a first joint 514a to a second joint 515b. A second link 515b mechanically couples a second joint 514b to a third joint 514c. The robotic arm 505 further comprises a third link 515c, a fourth link 515d, and a fifth link 515e which respectively mechanically couple the third joint 514c to a fourth joint 514d, the fourth joint 514d to a fifth joint 514e, and the fifth joint 514e to a sixth joint 514f. The robotic device 500 may comprise further joints and/or links not shown in the figures. For example, as mentioned above, in some examples, the robotic device may comprise one or more joints which allow translational, i.e. linear, movement in additional to joints which allow rotational movement. Each link may comprise a rigid elongate member. Each link may be a single unit or multiple coupled sub-units. Each link may have solid and/or hollow portions. In one case, a link may comprise a hollow tube and/or a frame of rigid material such as steel, aluminium or carbon fibre. In some examples, a tool (not shown in the figures) may be mechanically coupled to the end effector 512.

The robotic device 500 is positioned on a surface 570 defining an x-y plane. The x-y plane may be a horizontal plane such that the z-axis is a vertical axis. Though, this need not be the case in all examples. The position and/or orientation of the end effector 512 with respect to this three-dimensional co-ordinate system may be controlled by controlling the rotation of one or more of joints 514a-514f. Each of the joints 514a-514f is configured to rotate about at least one axis to allow movement of the end effector 512 within a particular degree of freedom. For example, one or more of the joints 514a-514f, in a given configuration of the robotic device 500, may rotate about an axis that is parallel to the z-axis, to allow a position of the end effector 512 within the x-y plane to be controlled. Further, one or more of the joints 514a-514f may be configured to rotate to control a position of the end effector 512 along the z-axis. In some examples, one or more of the joints 514a-514f may comprise either a ball joint or a two-joint assembly that allows respective rotation around axes parallel to both the z and y axes.

As mentioned above, the joints 514a-514f of the actuated robotic arm 505 may be rotated by applying respective joint torques to the joints 514a-514f. The joint torques are computed by a controller (not shown) performing a control method, such as an impedance control based method. The computed joint torques are applied to the joints by the propulsion system, which may comprise one or more electronic motors. For example, the propulsion system may comprise a plurality of electronic motors and one of the electronic motors may be located at each of the joints 514a-514f.

The robotic device 500 also comprises one or more sensors for detecting a state of the robotic device 400 and feeding this to the controller for use in the control method. The sensors comprise at least one torque sensor comprising a torque sensor element according to aspects of the invention described herein. Other sensors may, for example, detect respective joint angles of the joints 514a-514f. A torque sensor comprising a torque sensor element according to the invention and a measuring element for measuring a deformation of the torque sensor element may be present in one or more, for example, all of the joints 514a-514f. For example, any of the joints 514a-514f may have the features described above with reference to FIGS. 6A-6D.

A drive control system (not shown) of the robotic device 500 may control a torque that is applied by one or more electric motors arranged at the joints 514a-514f in response to signals received from a controller (not shown). The controller may comprise one or more processors, including one or more microprocessors, central processing units and/or graphical processing units, and a memory (or memories). The controller is communicatively coupled to the example control components to control an action of the robotic device. This coupling may be achieved via a systems bus (not shown). The controller may, for example, provide desired joint torques that are converted by the set of joint control systems into joint actuator commands.

The above examples are to be understood as illustrative. Further examples are envisaged. Any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A torque sensor element for measuring a torque applied to a joint, the torque sensor element comprising:
   an outer frame to connect to a first side of a joint;
   an inner frame to connect to a second side of the joint, wherein the inner frame and the outer frame are coplanar;
   a compliant arrangement connecting the outer frame to the inner frame, wherein the compliant arrangement comprises:
      a first member and a second member, each extending between and connecting the outer frame to the inner frame, and each member being resilient and deformable to permit at least some relative rotation between the outer frame and the inner frame in response to a torque applied to the joint; and
      a connecting structure extending between and connecting the first member and the second member, the connecting structure comprising a first portion intermediate the first member and the second member which is configured in response to a deformation of the first and/or second member to move by an amount determined by a degree of relative rotation between the outer frame and the inner frame caused by a torque applied to the joint; and
   a first arm connected to the first portion, wherein the first arm is configured to move by an amount determined by the degree of relative rotation between the outer frame and the inner frame caused by the torque applied to the joint.

2. The torque sensor element according to claim 1, wherein the movement of the first portion of the connecting structure in response to the deformation of the first and/or second member comprises at least a rotational component.

3. The torque sensor element according to claim 1, wherein the first arm extends in a direction away from the inner frame.

4. The torque sensor element according to claim 3, wherein the outer frame comprises a gap and wherein the first arm extends through the gap.

5. The torque sensor element according to claim 1, wherein the connecting structure comprises at least one linking element linking the first member or the second member to the first portion, and configured to facilitate the movement of the first portion when the torque is applied to the joint.

6. The torque sensor element according to claim 5, wherein the connecting structure comprises a first linking element configured to connect the first member to the first portion and a second linking element configured to connect the second member to the first portion, and wherein each of the first linking element and the second linking element is configured to facilitate the movement of the first portion when the torque is applied to the joint.

7. The torque sensor element according to claim 1, wherein one or more beam elements connects or connect the outer frame to the inner frame, wherein the each of the one or more beam elements comprises one or more connecting members connecting the outer frame to the inner frame.

8. The torque sensor element according to claim 1, comprising a third member and a fourth member, each extending between and connecting the outer frame to the inner frame, and each of the third member and the fourth being resilient and deformable to permit at least some relative rotation between the outer frame and the inner frame in response to a torque applied to the joint; and
   a second connecting structure extending between the third member and the fourth member, the second connecting structure comprising a second portion intermediate the third member and the fourth member which is configured in response to a deformation of the third and/or fourth member to move by an amount determined by the degree of relative rotation between the outer frame and the inner frame caused by the torque applied to the joint.

9. The torque sensor element according to claim 8, wherein the second portion of the second connecting structure comprises a second arm configured to move by an amount determined by the degree of relative rotation between the outer frame and the inner frame caused by the torque applied to the joint.

10. A torque sensor for measuring a torque applied to a joint, the torque sensor comprising:
   the torque sensor element according to claim 1; and a measuring element for measuring an amount by which the first portion of the torque sensor element moves in response to a relative rotation between the outer frame and the inner frame caused by a torque applied to the joint, thereby to measure a torque applied to the joint.

11. The torque sensor according to claim 10, wherein the measuring element is configured to measure a degree of rotation of the first portion to thereby measure the torque applied to the joint.

12. The torque sensor according to claim 10, wherein the measuring element comprises a magnetic measuring element configured to measure the movement of the first portion of the connecting structure by measuring a change in a magnetic field due to the movement of the first portion.

13. A robotic device comprising:
a body;
an end effector coupled to the body by one or more joints;
a propulsion system to drive the one or more joints to control a state of the robotic device; and
the torque sensor according to claim 10, the torque sensor being arranged to measure the torque applied to one of the one or more joints.

14. The torque sensor element according to claim 1, wherein each of the inner and outer frames are circular, and wherein the connecting structure is spaced from and disposed radially between the inner and outer frames.

15. The torque sensor element according to claim 1, wherein the inner frame is circular, wherein the outer frame comprises first and second sections that collectively, partially surround the inner frame.

16. A torque sensor element for measuring a torque applied to a joint, the torque sensor element comprising:
an outer frame to connect to a first side of a joint;
an inner frame to connect to a second side of the joint, wherein the inner frame and the outer frame are coplanar; and
a compliant arrangement connecting the outer frame to the inner frame, wherein the compliant arrangement comprises:
a first member and a second member, each extending between and connecting the outer frame to the inner frame, and each member being resilient and deformable to permit at least some relative rotation between the outer frame and the inner frame in response to a torque applied to the joint; and
a connecting structure extending between and connecting the first member and the second member, the connecting structure comprising a first portion intermediate the first member and the second member which is configured in response to a deformation of the first and/or second member to move by an amount determined by a degree of relative rotation between the outer frame and the inner frame caused by a torque applied to the joint,
wherein each of the inner and outer frames are circular, and wherein the connecting structure is spaced from and disposed radially between the inner and outer frames,
wherein each of the first member and the second member includes first and second radial sections and an intermediate section, and wherein for each of the first and second members, the first radial section extends from the outer frame to the intermediate section in a radial direction of the torque sensor element, the second radial section extends from the inner frame to the intermediate section in the radial direction, and the intermediate section extends circumferentially about the inner frame from the first and second radial sections to the connecting structure.

17. The torque sensor element according to claim 16, wherein the connecting structure further comprises first and second linking elements, wherein the first linking element extends from the intermediate section of the first member to the first portion of the connecting structure, and wherein the second linking element extends from the intermediate section of the second member to the first portion of the connecting structure.

18. The torque sensor element according to claim 16, wherein the first and second radial sections of the first member are colinear and spaced from one another in the radial direction.

19. A torque sensor element for measuring a torque applied to a joint, the torque sensor element comprising:
an outer frame to connect to a first side of a joint;
an inner frame to connect to a second side of the joint, wherein the inner frame and the outer frame are coplanar; and
a compliant arrangement connecting the outer frame to the inner frame, wherein the compliant arrangement comprises:
a first member and a second member, each extending between and connecting the outer frame to the inner frame, and each member being resilient and deformable to permit at least some relative rotation between the outer frame and the inner frame in response to a torque applied to the joint; and
a connecting structure extending between and connecting the first member and the second member, the connecting structure comprising a first portion intermediate the first member and the second member which is configured in response to a deformation of the first and/or second member to move by an amount determined by a degree of relative rotation between the outer frame and the inner frame caused by a torque applied to the joint,
wherein the inner frame is circular, wherein the outer frame comprises first and second sections that collectively, partially surround the inner frame,
wherein each of the first member and the second member includes first and second radial sections and an intermediate section, and wherein for each of the first and second members, the first radial section extends from the outer frame to the intermediate section in a radial direction of the torque sensor element, the second radial section extends from the inner frame to the intermediate section in the radial direction, and the intermediate section extends circumferentially about the inner frame from the first and second radial sections to the connecting structure.

\* \* \* \* \*